(12) United States Patent
Liu et al.

(10) Patent No.: US 10,698,166 B2
(45) Date of Patent: Jun. 30, 2020

(54) FIBER OPTIC CONNECTOR AND METHOD OF ASSEMBLING THE SAME

(71) Applicant: CommScope Telecommunications (Shanghai) Co. Ltd., Shanghai (CN)

(72) Inventors: Lei Liu, Shanghai (CN); Zhaoyang Tong, Shanghai (CN)

(73) Assignee: COMMSCOPE TELECOMMUNICATIONS (SHANGHAI) CO. LTD., Shanghai (CN)

( * ) Notice: Subject to any disclaimer, the term of this patent is extended or adjusted under 35 U.S.C. 154(b) by 0 days.

(21) Appl. No.: 15/724,782

(22) Filed: Oct. 4, 2017

(65) Prior Publication Data
US 2018/0106972 A1 Apr. 19, 2018
US 2020/0150355 A9 May 14, 2020

Related U.S. Application Data

(63) Continuation of application No. 15/118,926, filed as application No. PCT/IB2015/050980 on Feb. 10, 2015, now Pat. No. 9,829,649.

(30) Foreign Application Priority Data

Feb. 14, 2014 (CN) .......................... 2014 1 0052557

(51) Int. Cl.
*G02B 6/38* (2006.01)
(52) U.S. Cl.
CPC ......... *G02B 6/3869* (2013.01); *G02B 6/3821* (2013.01); *G02B 6/3887* (2013.01); *G02B 6/3849* (2013.01)
(58) Field of Classification Search
CPC .. G02B 6/3887; G02B 6/3869; G02B 6/3821; G02B 6/3849
See application file for complete search history.

(56) References Cited

U.S. PATENT DOCUMENTS 4,327,964 A * 5/1982 Haesly ................. G02B 6/3865
29/453
4,762,389 A * 8/1988 Kaihara ............... G02B 6/3825
385/59

(Continued)

FOREIGN PATENT DOCUMENTS

EP 2 031 719 B1 1/2013

OTHER PUBLICATIONS

International Search Report and Written Opinion for International Application No. PCT/IB2015/050980 dated Aug. 18, 2015 (11 pages).

*Primary Examiner* — Thomas A Hollweg
*Assistant Examiner* — Mary A El Shammaa
(74) *Attorney, Agent, or Firm* — Merchant & Gould P.C.

(57) ABSTRACT

The present invention discloses a fiber optic connector comprising a housing, a spring, a ferrule assembly and a crimping seat. Before being inserted into the housing, the ferrule assembly is pre-assembled into the crimping seat in a manner of being movable relative to the crimping seat. The spring is pre-assembled into the housing before the ferrule assembly is inserted into the housing. After the pre-assembled ferrule assembly and crimping seat are inserted into the housing, the crimping seat is snap-fitted in the housing, and the spring pushes the ferrule assembly, so that the ferrule assembly is capable of being moved against the spring relative to the crimping seat. Before inserted into a housing of the fiber optic connector, some components may be pre-assembled together to form an integral assembly having a size less than that of a housing of the fiber optic connector. Accordingly, the integral assembly may be smoothly pulled through a small long pipe. After pulled through the pipe, the integral assembly may be easily and quickly inserted into the housing as a whole at one time.

10 Claims, 3 Drawing Sheets

(56) References Cited

U.S. PATENT DOCUMENTS

| | | | | |
|---|---|---|---|---|
| 5,212,752 A * | 5/1993 | Stephenson | G02B 6/3831 | 385/139 |
| 5,245,683 A * | 9/1993 | Belenkiy | G02B 6/3849 | 385/69 |
| 5,452,386 A * | 9/1995 | van Woesik | G02B 6/382 | 385/72 |
| 5,862,289 A * | 1/1999 | Walter | G02B 6/3855 | 385/134 |
| 5,915,058 A * | 6/1999 | Clairardin | G02B 6/3825 | 385/77 |
| 5,946,435 A * | 8/1999 | Zheng | G02B 6/29361 | 385/140 |
| 6,079,881 A * | 6/2000 | Roth | G02B 6/3825 | 385/139 |
| 6,081,647 A * | 6/2000 | Roth | G02B 6/3825 | 385/139 |
| 6,154,597 A * | 11/2000 | Roth | G02B 6/3825 | 385/139 |
| 6,296,399 B1 | 10/2001 | Halback et al. | | |
| 6,935,789 B2 * | 8/2005 | Gross, III | G02B 6/3847 | 385/59 |
| 6,945,704 B2 * | 9/2005 | Yamaguchi | G02B 6/3869 | 385/60 |
| 7,226,215 B2 * | 6/2007 | Bareel | G02B 6/3821 | 385/60 |
| 7,281,859 B2 * | 10/2007 | Mudd | G02B 6/3869 | 385/53 |
| 8,393,803 B2 * | 3/2013 | Hogue | G02B 6/3869 | 385/76 |
| 9,229,173 B2 | 1/2016 | Yamauchi et al. | | |
| 9,470,847 B2 * | 10/2016 | Grinderslev | G02B 6/3812 | |
| 2002/0076165 A1 * | 6/2002 | Childers | G02B 6/3869 | 385/78 |
| 2003/0077045 A1 | 4/2003 | Fleenor et al. | | |
| 2004/0101254 A1 * | 5/2004 | Erdman | G02B 6/3843 | 385/78 |
| 2004/0117981 A1 | 6/2004 | Roth et al. | | |
| 2005/0084215 A1 * | 4/2005 | Grzegorzewska | G02B 6/3869 | 385/60 |
| 2005/0135755 A1 * | 6/2005 | Kiani | G02B 6/3825 | 385/78 |
| 2006/0093300 A1 * | 5/2006 | Marrs | G02B 6/3802 | 385/134 |
| 2008/0013891 A1 * | 1/2008 | Nishioka | G02B 6/3809 | 385/59 |
| 2008/0089650 A1 * | 4/2008 | Legler | G02B 6/3878 | 385/59 |
| 2009/0148101 A1 * | 6/2009 | Lu | G02B 6/3816 | 385/56 |
| 2009/0185779 A1 * | 7/2009 | Gurreri | G02B 6/3846 | 385/81 |
| 2012/0243831 A1 * | 9/2012 | Chen | G02B 6/3825 | 385/55 |
| 2013/0322826 A1 * | 12/2013 | Henke | G02B 6/3834 | 385/60 |
| 2014/0050446 A1 * | 2/2014 | Chang | G02B 6/3869 | 385/81 |

* cited by examiner

FIBER OPTIC CONNECTOR AND METHOD OF ASSEMBLING THE SAME

CROSS-REFERENCE TO RELATED APPLICATION

This application is a continuation of U.S. application Ser. No. 15/118,926, filed on Aug. 15, 2016, which is a National Stage of PCT/IB2015/050980, filed 10 Feb. 2015, which claims the benefit of Chinese Patent Application No. 201410052557.X filed on Feb. 14, 2014 in the State Intellectual Property Office of China and which applications are incorporated herein by reference. To the extent appropriate, a claim of priority is made to each of the above disclosed applications.

BACKGROUND OF THE INVENTION

Field of the Invention

The present invention relates to a fiber optic connector and a method of assembling the fiber optic connector.

Description of the Related Art

In prior art, optical cables/fibers generally are optically coupled by following ways of:

1) Splicing Optical Fibers in Field

The way of splicing the optical cables/fibers generally comprises steps of: Firstly, processing ends of the optical fibers (including peeling off the optical cable, cleaning and cutting the optical fiber of the optical cable); Secondly, manually or automatically setting optimum splicing parameters of a splicing machine and relative positions of the optical fibers to be spliced based on material and type of the optical fiber; Thirdly, discharging an electric arc with the splicing machine to fuse the ends of the optical fibers, and slowly and linearly pushing the optical fibers toward each other to optically couple the optical fibers; Finally, contracting a heat shrinkable tube on a coupled joint of the optical fibers to protect the coupled joint, and winding the optical fibers to finish all splicing operations in the field. In this case, the splicing properties (including optical attenuation, echo, and long term reliability, etc.) of the optical fibers are in different degrees depended on various factors, such as, operation level of a splicing operator, operation steps, fiber winding level, cleanliness of electrodes of the splicing machine, splicing parameters, cleanliness of working environment, and so on. In addition, it is necessary to use various expensive apparatus, for example, high precision cutting tool, splicing machine or the like, to perform the splicing of the optical fibers in the field.

2) Cold Coupling Optical Fibers

In this solution, two processed optical fibers are fixed in a high precision V-shaped or U-shaped groove and aligned to each other. In addition, an optical matching paste is filled in the V-shaped or U-shaped groove to fill a gap between end surfaces of the two optical fibers. Compared with splicing, the cold coupling is relatively simpler and quicker, because the cold coupling does not need an electric power supply and a heat shrinkable tube to protect the spliced joint. However, the cold coupling is largely depended on cutting quality of the end surfaces of the optical fibers and the optical matching paste. If the cutting quality is poor, it decreases the coupling properties (including optical attenuation, echo, and long term reliability, etc.). Furthermore, as for the cold coupling with the V-shaped or U-shaped groove, the coupling loss is increased with the variation of the temperature. With the passage of time, because of the opened V-shaped or U-shaped groove, flowing away, pollution and aging occurring in the optical matching paste may cause the insertion loss to become larger or even reduce the optical signal to zero. Thereby, the cold coupling has a poor stability and long-term reliability.

3) Assembling Connector in Field

In the way of assembling connector in field, an optical fiber is pre-embedded in a ferrule. At one end of ferrule, an end surface of a standard connector is pre-polished, and at the other end of the ferrule, the pre-embedded fiber is placed in a high precision V-shaped groove with an optical matching paste filled therein. During assembling the connector in the field, the incoming optical fiber/cable is processed in the field (for example, opening the cable, peeling the fiber, cleaning and cutting the fiber), and inserted into the rear end of the connector until the end surface of incoming fiber abuts against the end surface of the pre-embedded fiber in the V-shaped or U-shaped groove, then the fibers are fixed by an external mechanical element. The way of assembling connector in field has a relatively high cost. In addition, it is necessary to use a special tool and an operation guide provided by the connector manufacturer. Also, because the optical matching paste is used, it has a poor stability and long-term reliability.

4) Integral Cable/Fiber Assembly in Factory

The integral cable/fiber assembly is manufactured in the factory. As for this way, it is reliable and is easy to use. However, it cannot be applied in a limited space, for example, in an application of fiber to the home or to the resident, it often needs to pull the cable/fiber assembly through a narrow pipe, especially a pipe in which other cables are paved.

In the above ways in the prior art, there are high requirements on the tool and the operator to assemble the connector in the field. Furthermore, in the prior art, before assembling a ferrule assembly, a spring and a spring seat into the connector housing, the ferrule assembly, the spring and the spring seat are separated from each other and cannot be pre-assembled together. Thereby, in the prior art, the ferrule assembly, the spring and the spring seat must be assembled into the connector housing one by one. Such way of assembling the connector is only adapted to assemble the ferrule assembly, the spring and the spring seat into the connector housing in the factory, and is not adapted to assemble the ferrule assembly, the spring and the spring seat into the connector housing in the field. As a result, the completely assembled connector in the factory cannot be pulled through the narrow pipe in the field, because the completely assembled connector has a large profile size.

SUMMARY OF THE INVENTION

The present invention has been made to overcome or alleviate at least one aspect of the above mentioned disadvantages.

According to an object of the present invention, there is provided a fiber optic connector and a method of assembling the fiber optic connector, wherein a ferrule assembly and a crimping seat are adapted to be pre-assembled to an integral cable assembly having a profile size less than that of a connector housing. In this way, the cable assembly with small profile size may be easily pulled through an elongated pipe in the field. Furthermore, after being pulled through the elongated pipe, the cable assembly as a whole may be quickly assembled into the connector housing in the field.

According to another object of the present invention, there is provided a fiber optic connector and a method of assembling the fiber optic connector, wherein various components of the connector may be correctly and quickly assembled into the connector housing, effectively saving the assembling time and reducing mistake operations.

According to another object of the present invention, there is provided a fiber optic connector and a method of assembling the fiber optic connector, wherein various components of the connector may be pre-assembled to an integral assembly, and an end surface of a ferrule and a fiber are protected to prevent them from damage during assembling the integral assembly into the connector housing, improving the long term reliability of an interconnection of fiber optic connectors.

According to an aspect of the present invention, there is provided a fiber optic connector comprising a housing, a spring, a ferrule assembly and a crimping seat. Before being inserted into the housing, the ferrule assembly is pre-assembled into the crimping seat in a manner of being movable relative to the crimping seat. The spring is pre-assembled into the housing before the ferrule assembly is inserted into the housing. After the pre-assembled ferrule assembly and the crimping seat are inserted into the housing, the crimping seat is snap-fitted in the housing, and the spring pushes the ferrule assembly, so that the ferrule assembly is capable of being moved against the spring relative to the crimping seat.

According to an exemplary embodiment of the present invention, the ferrule assembly comprises: a ferrule; and a ferrule seat with a front end fixedly connected to the ferrule and a rear end fitted in the crimping seat.

According to another exemplary embodiment of the present invention, the ferrule and the ferrule seat are formed into a single piece.

According to another exemplary embodiment of the present invention, a slot is formed in an outer circumferential surface of a front end of the ferrule seat, a retaining member is fitted in the slot through the housing after the ferrule seat is inserted into the housing, and the spring pushes the retaining member, so as to exert an axial elastic force on the ferrule assembly.

According to another exemplary embodiment of the present invention, a spring holding seat and a spring moving block are provided in the housing, and the spring is compressed between the spring holding seat and the spring moving block; and the spring moving block abuts against the retaining member under the push of the spring.

According to another exemplary embodiment of the present invention, a protrusion is formed on a front end portion of the crimping seat, and the protrusion is snapped into a recess formed in the spring holding seat.

According to another exemplary embodiment of the present invention, an insertion opening is formed in the housing, and the retaining member is inserted into the slot of the ferrule seat through the insertion opening after the ferrule assembly is inserted into the housing.

According to another exemplary embodiment of the present invention, the crimping seat has an insertion chamber defined by a plurality of petal shaped parts, and the rear end of the ferrule seat is inserted into the insertion chamber of the crimping seat.

According to another exemplary embodiment of the present invention, the fiber optic connector further comprises: a crimp ring configured to crimp a strengthening element of an optical cable on a rear end of the crimping seat; and a stress relief tube configured to be sleeved on the crimp ring crimped on the rear end of the crimping seat.

According to another exemplary embodiment of the present invention, the fiber optic connector further comprises: a dust cap fitted on the front end of the ferrule.

According to another exemplary embodiment of the present invention, the optical cable, the dust cap, the ferrule assembly, the spring seat, the crimp ring and the stress relief tube are pre-assembled together to form a cable connection assembly as a whole before being inserted into the housing; the spring, the spring moving block and the spring holding seat are pre-assembled in the housing before the cable connection assembly is inserted into the housing; and the protrusion of the crimping seat is snapped into the recess of the spring holding seat after the cable connection assembly is inserted into the housing, so as to limit the cable connection assembly in the housing.

According to another aspect of the present invention, there is provided a method of assembling a fiber optic connector, comprising steps of:

pre-assembling an optical cable, a dust cap, a ferrule assembly, a crimping seat, a crimp ring and a stress relief tube together to form a cable connection assembly as a whole;

pre-assembling a spring, a spring moving block and a spring holding seat in a housing of the fiber optic connector before the cable connection assembly is inserted into the housing; and inserting the cable connection assembly as a whole into the housing in which the spring, the spring moving block and the spring holding seat have been pre-assembled.

The ferrule assembly is pre-assembled into the crimping seat in a manner of being movable relative to the crimping seat. After the cable connection assembly is inserted into the housing, the crimping seat is snapped in the spring holding seat, so as to limit the cable connection assembly in the housing. After the cable connection assembly is inserted into the housing, the spring pushes the ferrule assembly, so that the ferrule assembly is capable of being moved against the spring relative to the crimping seat.

According to an exemplary embodiment of the present invention, the above method further comprises a step of: pulling the cable connection assembly through an elongated pipe before inserting the cable connection assembly into the housing.

According to another exemplary embodiment of the present invention, the ferrule assembly comprises a ferrule, and a ferrule seat with a front end fixedly connected to the ferrule and a rear end fitted in the crimping seat.

According to another exemplary embodiment of the present invention, a slot is formed in an outer circumferential surface of a front end of the ferrule seat, and a retaining member is fitted in the slot after the ferrule seat is inserted into the housing, so as to block the ferrule seat from being moved out of the housing under the push of the spring.

According to another exemplary embodiment of the present invention, the spring is compressed between the spring moving block and the spring holding seat; and the spring moving block abuts against the retaining member under the push of the spring.

According to another exemplary embodiment of the present invention, a protrusion is formed on a front end portion of the crimping seat, and the protrusion is snapped into a recess formed in the spring holding seat after the crimping seat is inserted into the housing.

According to another exemplary embodiment of the present invention, an insertion opening is formed in the housing, and the retaining member is inserted into the slot of the ferrule seat through the insertion opening after the ferrule assembly is inserted into the housing.

According to another exemplary embodiment of the present invention, the crimping seat has an insertion chamber defined by a plurality of petal shaped parts, and the rear end of the ferrule seat is inserted into the insertion chamber of the crimping seat.

According to another exemplary embodiment of the present invention, the crimp ring is configured to crimp a strengthening element of the optical cable on a rear end of the crimping seat; and the stress relief tube is configured to be sleeved on the crimp ring crimped on the rear end of the crimping seat.

In the fiber optic connector and the method of assembling the fiber optic connector according to the above exemplary embodiments of the present invention, before being inserted into a housing of the fiber optic connector, some components, including the ferrule assembly and the crimping seat, of the connector may be pre-assembled together to form an integral assembly having a size less than that of a housing of the fiber optic connector. Accordingly, the integral assembly may be smoothly pulled through a small long pipe. Furthermore, after being pulled through the pipe, the integral assembly may be easily and quickly inserted into the housing as a whole at one time, saving the assembly time, avoiding mistake operations, effectively preventing the warp of the spring, protecting the end surface of the ferrule and the fiber from being damaged during the assembling process, and increasing the long term reliability of the interconnection of the fiber optic connectors.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
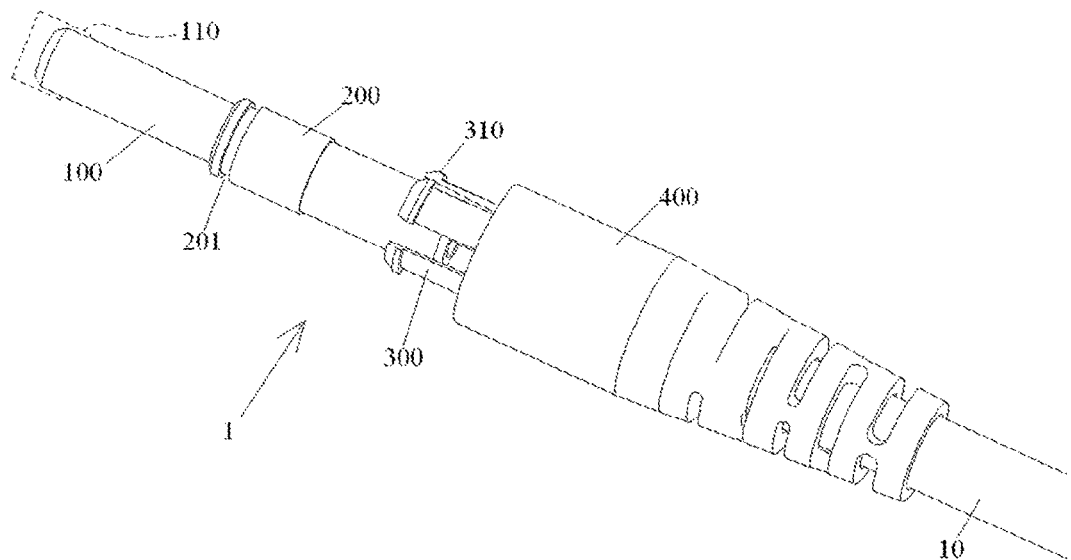
FIG. 1 is an illustrative perspective view of a cable connection assembly formed by assembling some components, including a ferrule assembly and a crimping seat, of a fiber optic connector according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a fiber optic connector comprising a housing, a spring, a ferrule assembly and a crimping seat. Before being inserted into the housing, the ferrule assembly is pre-assembled into the crimping seat in a manner of being movable relative to the crimping seat. The spring is pre-assembled into the housing before the ferrule assembly is inserted into the housing. After the pre-assembled ferrule assembly and crimping seat are inserted into the housing, the crimping seat is snapped in the housing, and the spring pushes the ferrule assembly, so that the ferrule assembly is capable of being moved against the spring relative to the crimping seat.

FIG. 1 is an illustrative perspective view of a cable connection assembly formed by assembling some components, including a ferrule assembly, a crimping seat, and so on, of a fiber optic connector according to an exemplary embodiment of the present invention.

In an exemplary embodiment, as shown in FIG. 1, the cable connection assembly 1 mainly comprises a ferrule assembly, a crimping seat 300 and an optical cable 10. In another exemplary embodiment, the cable connection assembly 1 may further comprise a crimp ring 410 (FIG. 6), a stress relief tube 400, and a dust cap 110.

Figure 5:
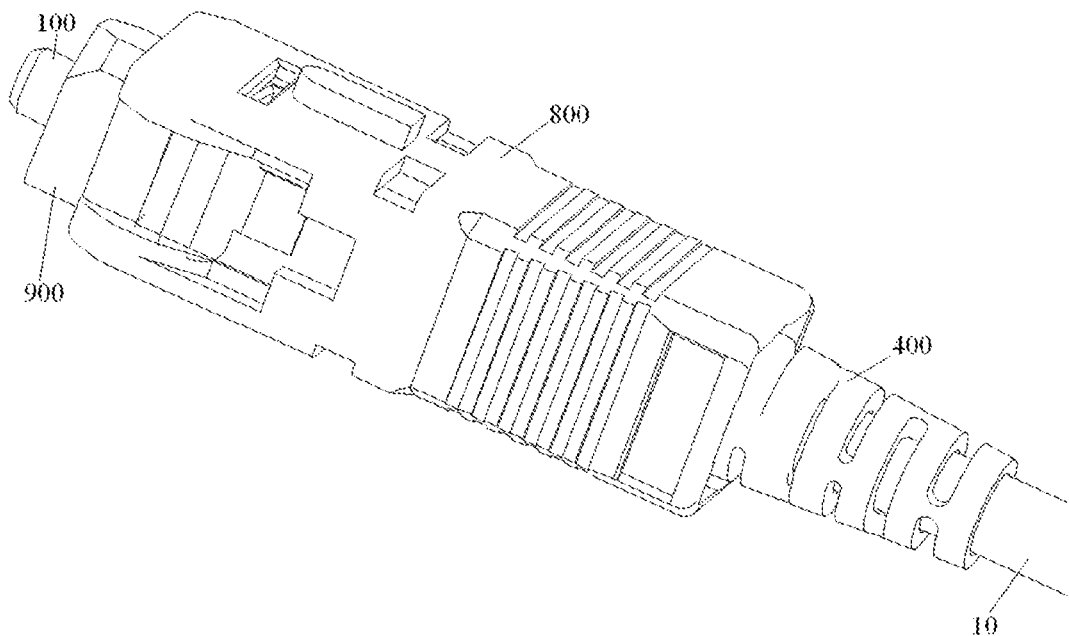
FIG. 5 is an illustrative perspective view of a complete fiber optic connector after the cable connection assembly of FIG. 1 is inserted into the housing in which the spring has been pre-assembled.
Figure 6:
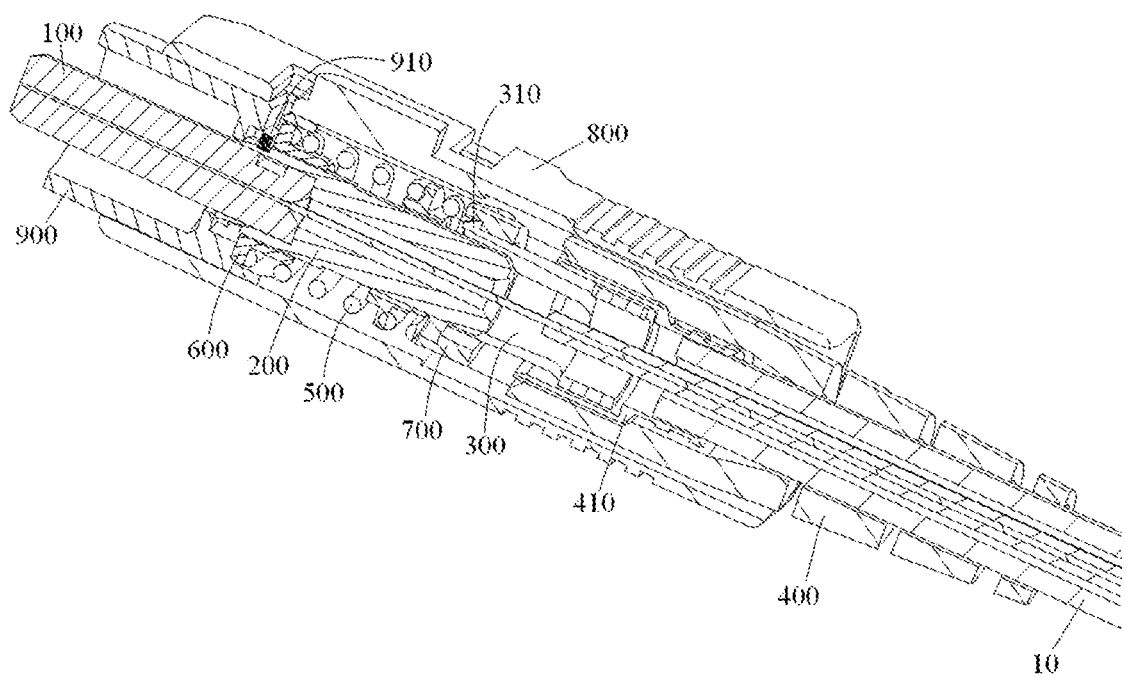
FIG. 6 is an illustrative cross section view of the fiber optic connector of FIG. 5.

FIG. 5 is an illustrative perspective view of a complete fiber optic connector after the cable connection assembly 1 of FIG. 1 is inserted into the housing in which a spring 500 has been pre-assembled; and FIG. 6 is an illustrative cross section view of the fiber optic connector of FIG. 5.

As shown in FIGS. 1, 5-6, the ferrule assembly comprises: a ferrule (100); and a ferrule seat (200) with a front end (left end or distal end in the Figs.) fixedly connected to a rear end of the ferrule (100) and a rear end (right end or approximate end in the Figs.) fitted in the crimping seat (300). In an alternative embodiment, the ferrule 100 and the ferrule seat 200 may be formed into a single piece. A fiber of the optical cable 10 is inserted into and fixed in a bore of the ferrule 100. In the illustrated embodiment, the ferrule 100, the ferrule seat 200 and the optical cable 10 may be together regarded as the ferrule assembly.

Referring to FIGS. 1 and 6, the dust cap (indicated by dash line in FIG. 1) 110 is fitted on a front end of the ferrule 100, so as to protect the front end surface of the ferrule 100 and a fiber of the optical cable 10 from being damaged during assembling the pre-assembled cable connection assembly 1 into the connector housing.

As shown in FIGS. 1 and 6, the crimping seat 300 has an insertion chamber defined by a plurality of petal shaped parts, and a rear end of the ferrule seat 200 is inserted into the insertion chamber of the crimping seat 300 and movable forward and backward relative to the crimping seat 300 in the insertion chamber of the crimping seat 300.

As shown in FIGS. 1 and 6, the crimp ring 410 is constructed to crimp a strengthening element of the optical cable 10 on a rear end of the crimping seat 300, and the stress relief tube 400 is sleeved on the crimp ring 410 crimped on the rear end of the crimping seat 300.

Figure 2:
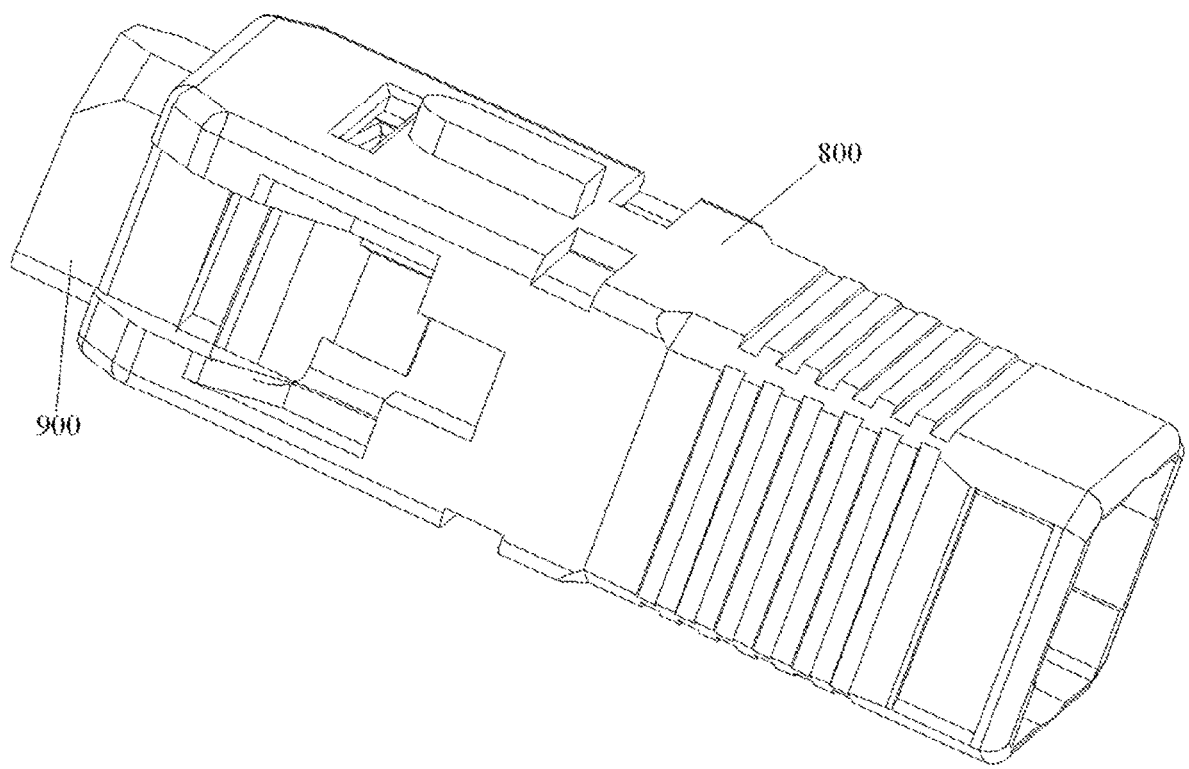
FIG. 2 is an illustrative perspective view of a housing of a fiber optic connector according to an exemplary embodiment of the present invention, wherein a spring is pre-assembled in the housing.
Figure 3:
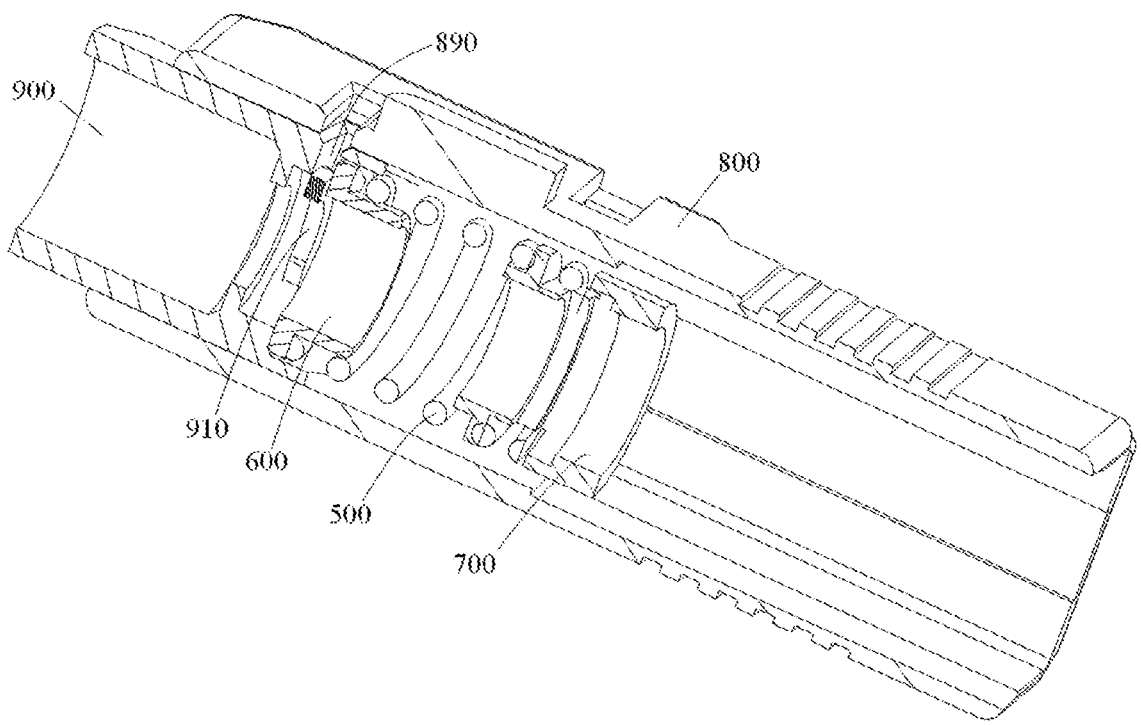
FIG. 3 is an illustrative cross section view of the housing of the fiber optic connector shown in FIG. 2.

FIG. 2 is an illustrative perspective view of housings 800, 900 of a fiber optic connector according to an exemplary embodiment of the present invention, wherein a spring 500 is pre-assembled in the housings 800, 900; FIG. 3 is an illustrative cross section view of the housings 800, 900 of the fiber optic connector shown in FIG. 2.

As shown in FIGS. 2-3, the fiber optic connector comprises an outer housing 800 and an inner housing 900 adapted to be fitted in the outer housing 800.

As shown in FIGS. 2-3 and 6, a spring holding seat 700 and a spring moving block 600 are provided in the inner housing 900, and the spring 500 is compressed between the spring holding seat 700 and the spring moving block 600.

Figure 4:
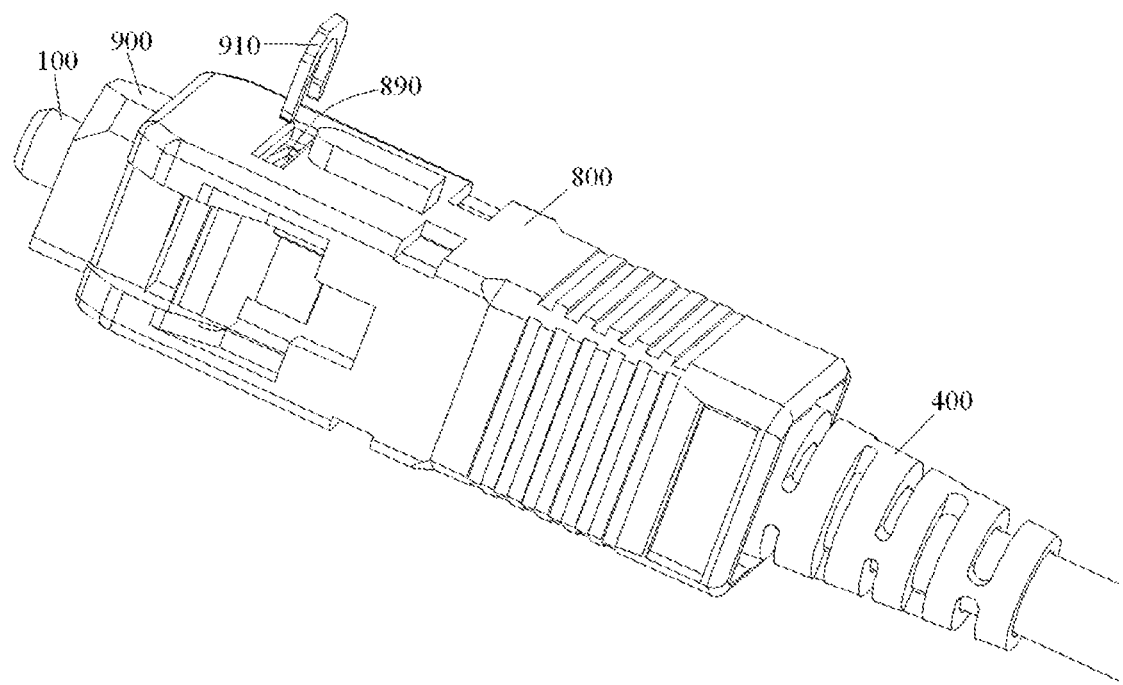
FIG. 4 is an illustrative view of inserting the cable connection assembly of FIG. 1 into the housing in which the spring has been pre-assembled.

FIG. 4 is an illustrative view of inserting the cable connection assembly 1 of FIG. 1 into the housings 800, 900 in which the spring 500 has been pre-assembled.

As shown in FIGS. 1-6, a slot 201 is formed in an outer circumferential surface of a front end of the ferrule seat 200. After the ferrule seat 200 is inserted into the housings 800, 900, a retaining member 910 is fitted in the slot 201 through the outer housing 800. The spring 500 pushes the retaining member 910, so as to exert an axial elastic force on the ferrule assembly.

As shown in FIG. 6, the spring moving block 600 abuts against the retaining member 910 under the push of the spring 500. In this way, the spring 500 is provided to push the ferrule assembly, so that the ferrule assembly is capable of being moved against the spring 500 relative to the crimping seat 300.

As shown in FIGS. 1-6, a protrusion 310 is formed on a front end (distal end) portion of the crimping seat 300, and the protrusion 310 is snapped into a recess formed in the spring holding seat 700 after the crimping seat 300 is inserted into the connector housing.

As shown in FIG. 4, an insertion opening 890 is formed in the outer housing 800 of the fiber optic connector, and the retaining member 910 is inserted into the slot 201 of the ferrule seat 200 through the insertion opening 890 after the cable connection assembly 1 is inserted into the housings 800, 900.

In an exemplary embodiment, as shown in FIGS. 1-6, the optical cable 10, the dust cap 110, the ferrule assembly, the spring seat 300, the crimp ring 410 and the stress relief tube 400 are pre-assembled together to form a cable connection assembly 1 as a whole before being inserted into the connector housing. The spring 500, the spring moving block 600 and the spring holding seat 700 are pre-assembled in the housing before the cable connection assembly 1 is inserted into the connector housing. The protrusion 310 of the crimping seat 300 is snapped into the recess of the spring holding seat 700 after the cable connection assembly 1 is inserted into the housing, so as to limit the cable connection assembly 1 in the housing. In this way, a complete fiber optic connector is obtained.

According to another exemplary embodiment of the present invention, there is also disclosed a method of assembling a fiber optic connector, comprising steps of:

pre-assembling an optical cable 10, a dust cap 110, a ferrule assembly, a crimping seat 300, a crimp ring 410 and a stress relief tube 400 together to form a cable connection assembly 1 as a whole; and pre-assembling a spring 500, a spring moving block 600 and a spring holding seat 700 in a housing of the connector before the cable connection assembly 1 is inserted into the housing; and inserting the cable connection assembly 1 as a whole into the housing in which the spring 500, the spring moving block 600 and the spring holding seat 700 have been pre-assembled, then snap-fitting a protrusion 310 of the crimping seat 300 into a recess of the spring holding seat 700 after the cable connection assembly 1 being inserted into the housing, so as to limit the cable connection assembly 1 in the housing.

In the above method, the ferrule assembly is pre-assembled into the crimping seat 300 in a manner of being movable relative to the crimping seat 300, as shown in FIG. 1.

In the above method, after the cable connection assembly 1 is inserted into the housing, as shown in FIG. 6, the crimping seat 300 is snap-fitted in the spring holding seat 700, so as to limit the cable connection assembly 1 in the housing.

In the above method, after the cable connection assembly 1 is inserted into the housing, as shown in FIG. 6, the spring 500 pushes the ferrule assembly, so that the ferrule assembly is capable of being moved against the spring 500 relative to the crimping seat 300.

In an exemplary embodiment, the above method further comprises a step of: pulling the cable connection assembly 1 through an elongated pipe before inserting the cable connection assembly 1 into the connector housing.

Although the housing, in the illustrated embodiment, comprises the outer housing 800 and the inner housing 900 fitted in the outer housing 800, the present invention is not limited to this, the housing may comprise a single housing.

In the fiber optic connector and the method of assembling the fiber optic connector according to the above exemplary embodiments of the present invention, before being inserted into the connector housing, some components, including the ferrule assembly and the crimping seat, of the connector may be pre-assembled together to form an integral assembly having a size less than that of the housings of the fiber optic connector. Accordingly, the integral assembly with small size may be smoothly pulled through a small long pipe. Furthermore, after being pulled through the pipe, the integral assembly may be easily and quickly inserted into the housing as a whole at one time, saving the assembly time, avoiding mistake operations, effectively preventing the warp of the spring, protecting the end surface of the ferrule and the fiber from being damaged during the assembling process, and increasing the long term reliability of the interconnection of the fiber optic connectors.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A fiber optic connector assembly extending axially between a front end surface and a back end surface and comprising:
   an outer housing;
   an inner housing at least partially disposed within the outer housing and extending axially rearwards from the front end surface of the assembly;
   a spring moving block disposed within the outer housing, a forward end of the spring moving block abutting a rear facing surface of the inner housing;
   a spring holding seat disposed within the outer housing and axially rearward of the spring moving block; and
   a spring disposed in the outer housing and having a front end abutting the spring moving block and a rear end abutting the spring holding seat;
   wherein the outer housing comprises an insertion opening adapted to receive a retaining member, the insertion opening being radially aligned with a portion of the inner housing that is forward of the rear facing surface of the inner housing.

2. The fiber optic connector assembly of claim 1, wherein the assembly lacks an optical fiber and lacks an optical fiber ferrule.

3. The fiber optic connector assembly of claim 1, wherein the assembly is adapted to receive a ferrule assembly, and wherein the spring holding seat is adapted to engage a crimping seat of the ferrule assembly.

4. The fiber optic connector assembly of claim 3, wherein a retaining member received through the insertion opening is adapted to engage a slot on a ferrule seat of a ferrule of the ferrule assembly.

5. The fiber optic connector assembly of claim 1, further comprising a retaining member disposed within the outer housing, forward of and abutting the spring moving block, and radially aligned with the insertion opening.

6. A fiber optic connector assembly extending axially between a front end and a back end and comprising:
   an outer housing, the outer housing including a radially extending insertion opening through a wall of the outer housing;
   an inner housing at least partially disposed within the outer housing;
   a spring moving block disposed within the outer housing and positioned within a recess defined by the inner housing, the recess having an open end at a rear end face of the inner housing, a forward end of the spring moving block abutting a rear facing surface of the inner housing;
   a spring holding seat disposed within the outer housing and axially rearward of the spring moving block;
   a spring disposed in the outer housing and having a front end abutting the spring moving block and a rear end abutting the spring holding seat;
   a retaining member disposed within the outer housing and within the recess defined by the inner housing, forward of and abutting the spring moving block, and radially aligned with the insertion opening; and
   a ferrule assembly, the ferrule assembly being engaged with the retaining member such that an axially rearward force applied to the ferrule assembly causes rearward axial compression of the spring.

7. The fiber optic connector assembly of claim 6, wherein the ferrule assembly comprises a ferrule and a ferrule seat fixedly connected to the ferrule, and wherein the ferrule seat is engaged with the retaining member.

8. The fiber optic connector assembly of claim 7, wherein the retaining member is engaged with a circumferential slot of the ferrule seat.

9. The fiber optic connector assembly of claim 8, wherein the ferrule assembly further comprises a crimping seat disposed axially rearward of the ferrule, wherein the ferrule seat is axially slidingly received in an insertion chamber of the crimping seat, and wherein the crimping seat is fixed to the spring holding seat.

10. The fiber optic connector assembly of claim 9, wherein the insertion chamber is defined by a plurality of petal shaped parts.

* * * * *